Aug. 10, 1948.                L. WOLFE                2,446,568
                          MAGNETIC COMPASS
Filed May 16, 1944                              3 Sheets-Sheet 1
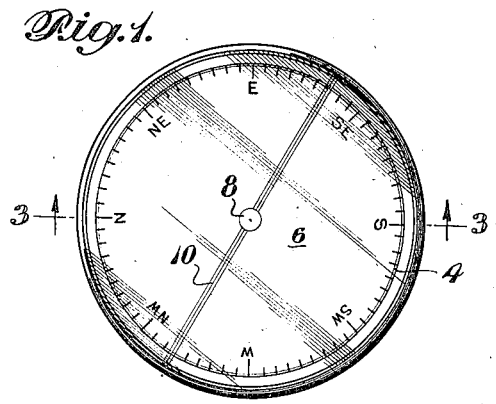
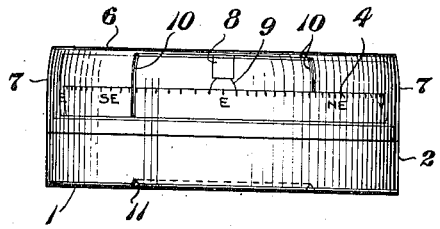
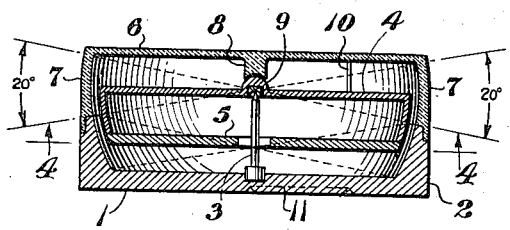
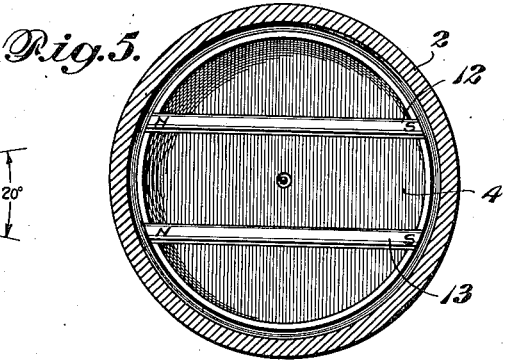
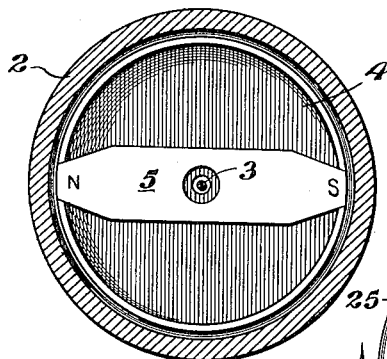
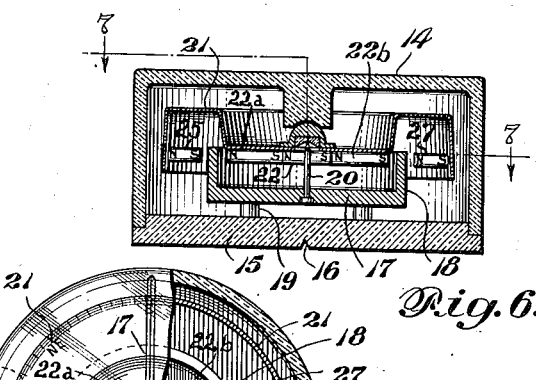
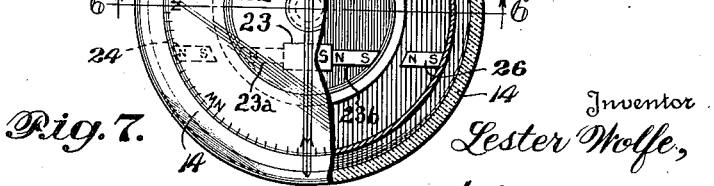
Inventor
Lester Wolfe,
By
Attorney

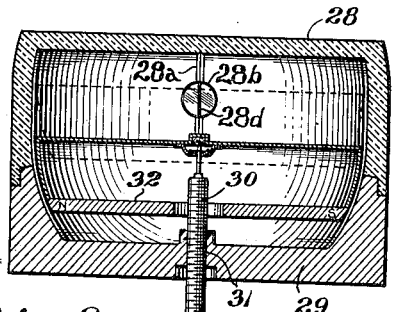
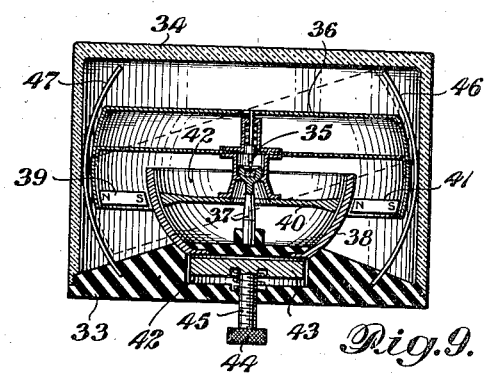
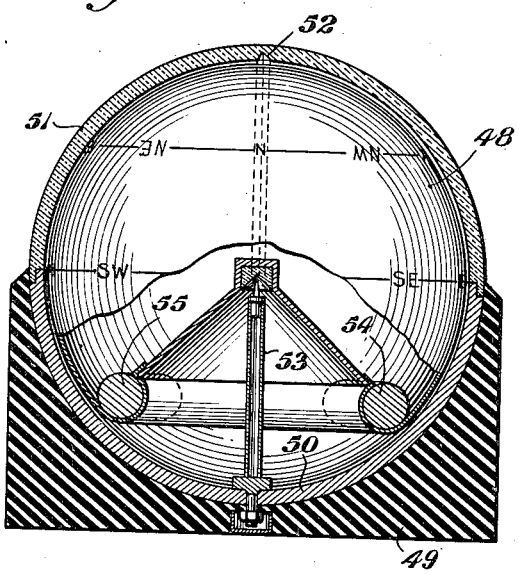
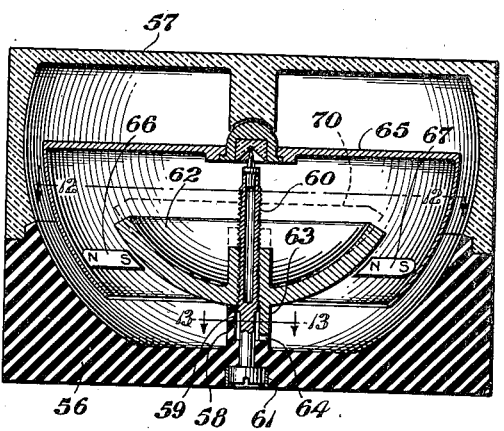
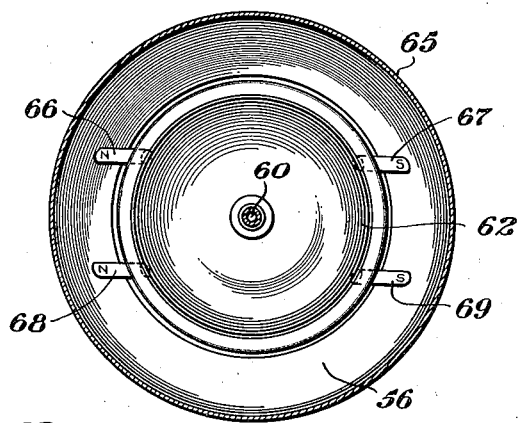
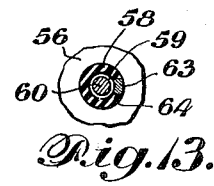

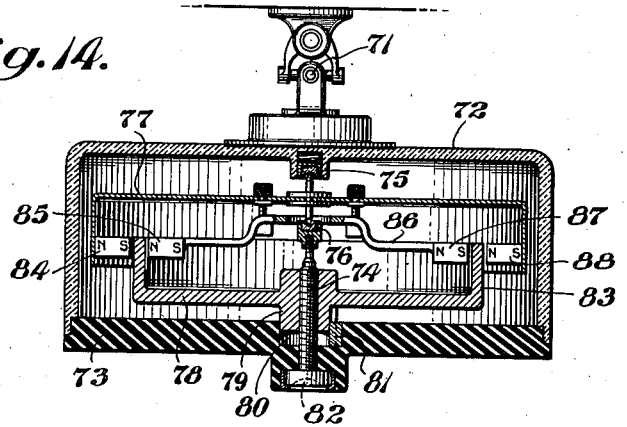

Patented Aug. 10, 1948

2,446,568

UNITED STATES PATENT OFFICE 2,446,568

MAGNETIC COMPASS

Lester Wolfe, United States Navy

Application May 16, 1944, Serial No. 535,801

11 Claims. (Cl. 33—72)

(Granted under the act of March 3, 1883, as amended April 30, 1928; 370 O. G. 757)

This invention relates to magnetic compasses, and in particular to damping and supporting means therefor.

The damping of magnetic compasses by means of eddy currents generated in stationary conducting cup like elements surrounding the magnets, which are attached to the compass card or indicator needle, is illustrated by the Patent No. 2,003,179 to Faus and the Patent No. 2,127,878 to Martin.

I have devised an improved form of eddy current damping type compass wherein a lighter compass card having the greatest mass of the magnetic elements adjacent the axis of rotation may be obtained and wherein the damping is improved. In one form of my invention eddy current means are used to damp the movement of the compass card about its vertical axis and liquid damping means are used to damp the tilting movements and vibrations resulting when the compass is mounted on aircraft or other engine driven apparatus. Due to the small size in which it can be made, and the improved damping characteristics of my compass it is equally adaptable for use as a precision compass for navigation purposes as in aircraft, autos, boats, etc., or for use as a pocket compass when afoot. In one embodiment the compass is specially designed for detachable mounting in a support on an aircraft or the like, whereby it can be detached and used as a pocket compass by the air crew after a crash or normal landing away from the aircraft's base. Among other advantages of my construction is the provision of means for changing the eddy current damping characteristics of the compass.

It is therefore a primary object of my invention to provide an improved magnetic compass utilizing eddy current damping.

Another object is the provision of means for varying the damping characteristics of an eddy current damping type magnetic compass.

Another object is the provision of an accurate compass of small size, having a top and side reading card and a transparent container surrounding the card, the lubber line being a substantially continuous line on the top and sides of the container whereby parallax can be eliminated, the compass being adapted to be detachably and adjustably mounted in a support having compensating means and attached to an airplane or the like. When detached from the support it may be used as a pocket compass, there being sighting means by which it may also be used as a pelorus, etc.

It is another object of my invention to provide a compass utilizing a combined eddy current and liquid damping system.

Other objects will become apparent as the description proceeds in connection with the attached drawings, in which:

Fig. 1 is a top plan view of an eddy current damped compass particularly adaptable as a pocket compass, having a top and side reading card, a transparent cover, and a continuous lubber line scribed on the sides and top of the transparent cover;

Fig. 2 is a side elevation of the compass shown in Fig. 1;

Fig. 3 is a sectional view taken along the line 3—3 of Fig. 1 looking in the direction of the arrows;

Fig. 4 is a sectional view taken along the line 4—4 of Fig. 3 and looking in the direction of the arrows;

Fig. 5 is a view similar to Fig. 4 but showing the use of a pair of spaced magnets instead of the single magnet of Fig. 4;

Fig. 6 is a sectional view of another embodiment, taken along the line 6—6 of Fig. 7, and looking in the direction of the arrows;

Fig. 7 is a plan view, partially in section along the line 7—7 of Fig. 6, looking in the direction of the arrows;

Fig. 8 is a side elevation in section of an embodiment wherein the damping is varied by changing the proximity of the magnetic elements to the conducting damping cup;

Fig. 9 is a side elevation in section of an embodiment wherein the damping is varied by varying the size or length of a gap in the conducting damping cup;

Fig. 10 is a side elevation, partly in section, of an embodiment wherein the compass card is spherical and can be read from the top or side;

Fig. 11 is a side elevation in section of another embodiment wherein the damping is varied by changing the proximity of the magnetic elements to the conducting cup;

Fig. 12 is a partial plan view, in section, along the line 12—12 of Fig. 11 and looking in the direction of the arrows;

Fig. 13 is a partial sectional view taken along the line 13—13 of Fig. 11 and looking in the direction of the arrows;

Fig. 14 is a side elevation, partly in section of an embodiment wherein a double pivoted card assembly type compass is hung from a universal joint suspension;

Fig. 15 is a side elevation, partly in section of an embodiment incorporating both eddy current and liquid damping;

Fig. 16 is a partial sectional view in a horizontal plane passing through the gimbal system of Fig. 15;

Fig. 17 is a side elevation, partly in section, of a compass detachably mounted in a support which is attached to the instrument board or other part of an airplane or the like; and Fig. 18 is a partial sectional view taken along the line 18—18 of Fig. 17 and looking in the direction of the arrows.

Figure 19 is an enlarged view of a part of Figure 18 showing the means of holding the compass in aligned position with respect to its support.

In the embodiment shown in Figs. 1 to 4 the compass comprises a cup having a bottom 1 and a side wall 2, the whole cup being of a high conducting metal, such as copper or silver. A pivot 3 is threaded or otherwise fixed to the center of the base and extends upwards, terminating in a point upon which a compass card 4 is pivotally supported. As shown in Figs. 1 and 2 the compass card is both top and side reading, with the scale on the top of the card being displaced by 180 degrees from the scale on the side. Thus the S mark on the side scale has the same angular position as the N mark on the top scale, and the other points of the compass are similarly displaced.

A magnet 5 is arranged diametrically of the card at its bottom, the ends of the magnet extending to within close proximity to the inner side walls 2 of the metallic cup. In the construction shown the compass card 4 is free to tilt 10 degrees either side of the horizontal, or a total tilt of 20 degrees. A transparent cup shaped cover 6 having a side wall 7 has mating engagement with the side wall 2 of the bottom cup, and is secured thereto by screw threads, cement, or the like, so that the joint is watertight.

On its underside, the cover 6 has a central stud 8 which has a concave surface that mates with a central convex projection 9 on the top of the compass card. The surfaces of the stud and projection are spaced so that they do not touch when the compass is in normal use. However, when the compass is inverted the surfaces engage and prevent the card from falling off of the pivot 3.

A lubber line 10 is provided by engraving a line or groove on one surface of the transparent cover 6 and its side 7. Preferably the lubber line is on the inner surface, since that surface is nearer to the card. A continuous metallic lubber line, with its bottom ends contacting the metal cup provides an electrostatic shield. As best shown in Figs. 1 and 2 the lubber line is continuous up the side 7, then diametrically across the cover 6 except where it is interrupted by the stud 8, and then down the side 7 again, but 180 degrees away from the first mentioned side location. With this arrangement, parallax can be completely avoided when looking either at the side or the top of the compass card by lining up the side and top lubber line in the same plane with the eye before reading the compass card.

Sighting means are also provided, so that the compass may be used as a pelorus etc. This means conveniently takes the form of a V groove 11 cut diametrically across the bottom 1 of the metallic cup, and in the same vertical plane as the lubber line 10. When finding the bearing of an object the compass is held in the horizontal position and the object is viewed by sighting it along the groove 11. After it is correctly lined up with the groove its bearing is found by reading the compass card behind the lubber line. For use as a sighting means the groove is shown by way of example only, it being understood that other devices may be used, and they need not be located on the base. Another sighting means is described later in connection with Fig. 8. The groove 11 may also be used to locate the compass in a support as will be described later in connection with Figs. 17 and 18.

The cup shaped transparent cover 6 may be made of a transparent non-static phenol plastic. If a material such as "Lucite" is used a conductive coating such as a film of carnauba wax or a thin transparent metallic film should be applied to its interior surface.

Fig. 5 is a view similar to Fig. 4 and showing a compass similar to that of Figs. 1 to 4, but using a pair of horizontally spaced magnets 12 and 13 of like polarity attached to the card instead of a single magnet. This arrangement effects eddy current damping of movement of the compass card about a north and south axis since the magnets 12 and 13 are parallel to but spaced from the axis. The conducting cup shaped bottom 1 and side wall 2 damp the movement of the magnet 5 and the attached compass card as is understood by those skilled in the art.

Figs. 6 and 7 illustrate a basic improvement in eddy current damping. The transparent cup shaped cover 14 is provided with a lubber line similar to that engraved on the cover 6 of Figs. 1 to 5, and extends down to the substantially flat base 15, which may be of non-conducting material. A V-shaped groove 16 extends diametrically across the bottom of the base in the same plane as the lubber line, for use as a sight or as locating means previously explained. A metallic damping cup having a bottom 17 and an annular side wall 18 is fastened to the base 15 as by studs 19. A pivot 20 extends upward from the damping cup and supports a compass card 21 having top and side reading scales. The central part of the card 21 has a well portion, the bottom part of which carries a glass jewel V bearing which rests on the pivot 20. Also fixedly attached to the well bottom are a pair of short spaced rod-like elements 22 and 23 which are parallel and in the same horizontal plane. At each end of elements 22 and 23 and in axial alignment with them are elements 22a and 22b and 23a and 23b respectively, which are also fixedly attached to the well bottom, but may be of smaller cross-sectional area than elements 22 and 23, as best shown in Fig. 7. They extend to within close proximity of the annular side wall 18 of the damping cup. Attached to the compass card, as to its side reading scale, and in the same horizontal plane as and coaxial with elements 22 and 23 etc. are short rod-like elements 24, 25, 26 and 27 having substantially the same cross-sectional area as elements 22a etc. As shown in Figs. 6 and 7 the wall 18 of the damping cup extends into the space between the outer ends of the elements 22a and 22b and the elements 23a and 23b carried by the compass card well, and the inner ends of the elements 24 to 27 carried by the side reading scale. The elements 22 to 27 inclusive form the magnetic system of the compass.

In the embodiment shown by Figs. 6 and 7, the central elements 22 and 23 which are of larger cross-sectional area, are magnetized rods of high coercive force material with their like poles extending in the same direction. Preferably these magnetized rods are of "Alnico V" which is a high magnetic force alloy containing approximately 8% aluminum, 14% nickel, 24% cobalt, 3% copper, and the balance iron, although any suitable high coercive force magnetic material may be used. Also in the same preferred embodiment the elements 22a, 22b, 23a, 23b, and 24 to 27 are of magnetic material having a low coercive force and a high degree of permeability, such as soft iron or an alloy of iron with cobalt and/or nickel. Such magnetic materials are characterized by high initial and maximum permeability. Because of the high permeability of these elements they may be of smaller cross-sectional area than that of the high coercive force elements 22 and 23 yet substantially all of the flux passing through the elements 22 and 23 will pass through the highly permeable elements. Since the permeable elements 22a and 22b adjoin the ends of the high coercive element 22, the combination of the three produces a combination which is lighter in weight than if all were of high coercive force material, but the coercive force of the combination is substantially the same as if all three parts were of the larger cross-sectional area and of identical high coercive force material. Since the above described combination is lighter in weight, the entire compass card with the attached magnetic elements is lighter in weight, has less inertia, and is more easily damped. In a similar manner weight is saved in the use of the smaller cross-sectional area permeable material for the elements 24 to 27.

Each coaxial group of high coercive force and permeable elements is therefore the equivalent of one longer magnet, broken in two places, with the wall 18 of the cup occupying part of the gap between the breaks in the magnet. The conducting wall 18 thereby cuts a high intensity magnetic field existing between the unlike poles on either side of the gap. This magnetic field is much more concentrated in a small area in the damping cut than is the case when elements 24 to 27 are not used, and the eddy current damping effect is greatly increased over that obtained solely from leakage flux at the ends of the magnets, as in the device of Fig. 5. The weight of the card is reduced because of the lighter weight of the composite magnet than that of the solid high coercive force material magnet of Fig. 5.

The chief characteristic of the embodiment shown in Figs. 6 and 7, other than the decreased weight of the card, is the provision of a magnetic system which is pole seeking and which includes gaps in the magnetic elements thereof, the magnetic lines of flux bridging the gap being concentrated in a relatively small cross-sectional area so that when the side wall 18 of the cup extends into the gap between the magnetic elements it will intercept substantially all of the lines of flux and be greatly effective for the eddy current damping of the movement of the magnetic elements. Thus if it is not necessary to take advantage of the light card weight and low inertia produced by the arrangement of Figs. 6 and 7 the relative positions of the high coercive force material and of the permeable material can be changed. Thus, elements 22 to 23b inclusive could be of permeable material, and the outer elements 24 to 27 could be of high coercive force material. Also, all of the elements could be of high coercive force material, or other arrangements can be used.

In Fig. 8 is shown one means for varying the amount of damping obtainable in a compass having eddy current damping. The compass structure is similar to that of Figs. 1 to 5 except that both the transparent cup shaped top 28 and the copper or the like cup shaped bowl 29 are deeper than the corresponding parts of Figs. 1 to 5, the top 28 particularly being deeper. A pivot 30 is vertically adjustable as by screwing it upwards or downwards through a tapped hole 31 in the bottom of the bowl 29. By providing the vertical adjustment of the pivot, the compass card with its attached magnet 32 is raised or lowered with respect to the copper bowl 29 and the ends of the magnet are moved farther from or closer to the curved inner side wall of the bowl. By raising the magnet in this manner it is moved farther away from the influence of the side walls and bottom of the conducting copper bowl 29 and the eddy current damping effect is reduced. This structure provides means whereby the damping of the compass may be changed between maximum and minimum values.

Another type of sighting means by which the compass may be used as a pelorus is illustrated in Fig. 8. The lubber line 28a is engraved on the interior surface of the transparent cover, up both sides and along the top in a similar manner as the lubber line 10 of Figs. 1 to 3. At the two diametrically opposed side walls of the transparent cover where the lubber line 28a is engraved, the side walls are provided with flat portions 28b. Both the exterior and interior walls are provided with the flat portions, which are in axial alignment and are bisected by a continuation 28d of the lubber line 28a as shown in Fig. 8. To take a bearing on an object it is sighted through the flat portions 28b while holding the compass horizontal and aligning the two diametrically opposed lubber lines 28d with the object. The reading of the compass at the lubber line 28a is then noted. Instead of providing the flat portions as described, suitable optical lens provided with lubber lines 28d can be inserted into openings in the side wall where the flat portions 28b are shown, as will be understood by those skilled in the art.

Fig. 9 illustrates another method and means for obtaining a variation in the eddy current damping effect. In this case the variation is accomplished by changing the conductance of the metallic damping cup. A base 33 of non-conducting material is fastened at its periphery to the bottom edge of the cup shaped transparent cover 34. A pivot 35 having a resilient mounting in a compass card 36 rests upon a V bearing in the top of a central post 37 upstanding from the base 33. A hemispherical shaped copper cup 38 having an open bottom and top has its open bottom molded or otherwise fastened to the non-conducting base 33. A magnetic system comprising elements 39, 40 and 41 are fastened to the compass card and located in the same plane, both within and outside the bowl in an arrangement similar to that of Figs. 6 and 7. The second set of elements, horizontally spaced and parallel to the elements 39 to 41 are not shown in the sectional view of Fig. 9. As previously described in connection with Figs. 6 and 7, it is preferred that the central element 40 be of magnetized high coercive force material, and 39 and 41 of material having a high permeability, to reduce the weight of the card.

Within the base 33 and extending downwards from the bottom edge of the cup 38 is a cylindrical cavity 42 in axial alignment with the cup and post 37. A disc shaped copper element 43 is axially movable towards and away from the bottom edge of the cup 38 and within the cavity. At its uppermost position the disc contacts the bottom edge of the cup. Axial movement of the disc is accomplished by turning a knurled knob 44 on the outer end of a machine screw 45 fastened to the disc 43 and threaded through the bottom of the base 33. Lubber lines 46 and 47 are fastened to the base at points 180 degrees apart and are curved to lie in close proximity to the compass card. In the embodiment illustrated, the maximum damping effect is obtained when the disc 43 is in its uppermost position and contacting the bottom edge of the cup because then the conductance of the cup and disc is greatest. As the disc is moved downwards from the cup the gap between it and the cup increases and the conductance of the cup and disc decreases.

Fig. 10 illustrates a compass having a spherical compass card 48 having a side reading scale and a top reading scale. A base 49 has a hemispherical cavity therein and the cavity has a metallic lining 50 such as copper which provides a damping cup. If the base is of metal having a high degree of conductivity the liner is not necessary. A hemispherical shaped transparent cover 51 has a sealing engagement with the upper edge of the base and has a continuous lubber line 52 engraved on its inner surface. The same lubber line serves both the side and top reading scales on the compass card and parallax is avoided by reading the compass card from such a position that the lubber line appears as a straight line. The compass card is supported by a V bearing at its geometrical center which rests upon a pivot 53 which is fastened to the base 49, and the card is open to provide passage of the pivot. A pair of spaced magnets 54 and 55 have a curved shape to fit against the inside of the compass card, being fastened thereto at its bottom edge and in close proximity to the copper liner 50.

Figs. 11 and 12 show another arrangement wherein variable damping is obtained by changing the relative positions of the damping cup and magnetic system. In this particular arrangement, however, the damping cup is shifted, rather than the compass card and magnetic system as is the device of Fig. 8. In the device of Figs. 11 and 12 the cup shaped base 56 may be either metallic or non-conducting. The transparent cover 57 is sealed to the top edge of the base and is provided with a lubber line engraved on its inner surface as in the device of Figs. 1 to 4. A stud 58 having a central bore 59 projects from the center of the base. A rotatable pivot 60 having exterior threads is journalled in the base for rotation in the bore. At its lower end the pivot has a head with a screw driver slot or the like by which it can be rotated. Axial movement of the pivot is prevented by a flanged element 61 partly overlying the aforementioned head, and by a shoulder on the base under the head. A copper cup 62 of circular cross-section has a central stud which is tapped to fit the threads on the pivot 60. On its lower side the cup has an exterior key 63 which fits in a slot or keyway 64 in the stud 58 as shown in Fig. 13. Since the cup is keyed against rotation by engagement of the key in the slot, when the pivot 60 is rotated the cup will move axially along its length.

A compass card 65 has a flat top having a top reading scale, and a curved side wall substantially concentric with the cup 62 when the cup is in its lowermost position. The side wall also carries a compass scale. Four magnets 66, 67, 68 and 69 form the magnetic system and are fastened to the compass card between the card and the cup as shown in Figs. 11 and 12. The inner ends of the magnets lie within close proximity of the outer wall of the cup 62 when the cup is in its lowest position. The largest damping effect is obtained with the cup in such lowest position and the damping is reduced by rotating the pivot so that the cup is raised. The cup is shown in a raised position by the dotted outline 70 thereof.

Fig. 14 shows an arrangement wherein the compass is supported by an overhead universal suspension 71 which is fastened to the transparent cover 72. The base 73 has a pivot stud 74 journalled for rotation therein as in the arrangement shown in Fig. 11. The compass card 77 is of the double pivoted type which rotates about a vertical axis but does not tilt with respect to its case, the upper pivot engaging a V or ring bearing 75 in the top 72 and the lower pivot engaging a V or ring bearing 76 on the top of the pivot stud 74.

A copper damping cup 78 has a central stud 79 which fits slidably within a bore 80 in the base and is prevented from rotation therein by means of a key 81 which engages both the stud and the base. The stud 79 has internal threads which engage mating threads on the pivot 74. Accordingly, when the pivot is rotated as by a screw driver slot 82 on its headed end, the cup 78 will be moved up or down within the compass housing formed by the cover 72 and base 73.

The damping cup has an upstanding annular wall 83 concentric with respect to and spaced inwardly from the depending side of the compass card 77. The magnetic system of the compass comprises elements 84, 85, 86, 87 and 88, all carried by the compass card, and in axial alignment. All of these elements may be of magnetized high coercive force material, or some of them may be of the permeable material previously described. It is preferred that the central element 86 be of high coercive force material and the outer elements 84, 85, 87 and 88 be of the smaller size permeable material to obtain a light weight card, as previously described.

In the arrangement of Fig. 14, because of the fact that the compass card does not tilt with respect to the case or the metal cup, the provision of a duplicate set of horizontally spaced magnets to damp the movement of the card about the north-south axis as in Figs. 6, 7, 9, 10, 11 and 12 is not needed.

Figs. 15 and 16 illustrate an embodiment of my invention which utilizes liquid damping to damp the transmission of engine vibrations or the like, in combination with eddy current damping of the rotation of the compass card about the vertical axis.

An exterior housing may comprise three elements 89, 90, and 91 joined together at leak proof joints. The central and top elements 90 and 91 are transparent so that the side of the compass card is visible. The lower element 89 which forms the supporting base, has an interior central stud 92 having a central bore 93. A post 94 is mounted for limited vertical movement within the bore 93, a screw 95 in the stud 92 engaging a vertical slot in the hollow wall of the post 94 to limit the vertical movement of the post and to hold it against rotation. A spring 96, within the hollow portion of the post, rests upon the bottom of the bore 93. As best shown in Fig. 16, the top of the post 94 has a gimbal ring 97 pivotally attached thereto by means of a pin 98.

A circular base 99 having a central and upwardly extending recess 100 is pivotally attached to the gimbal ring 97 by pins 101 and 102 which are in the same plane as the pin 98. By reason of the above described gimbal mounting support, the base 99 and the compass mounted thereon are able to tilt about any axis which is at right angles to the post 94, but cannot rotate about the axis of the post. The gimbal system described is above the center of gravity of the base 99 and the compass carried thereby, so that the base 99 will normally be suspended in a horizontal position due to its pendulosity. A transparent cup shaped cover 103 is fastened to the periphery of the base 99 with a liquid tight joint. The cover 103 and the recess 100 on the base have a pair of opposed V bearings in which a double pivot 104 is journalled. A compass card having an upstanding annular wall 105 and top annular wall 105a, both having scales, is carried by the pivot. Since the compass card is carried by a double pivot it cannot tilt within the cover 103, but may rotate only about the pivot axis.

A cylindrical copper shell 106 is attached to the cover 103 and extends downwardly to within a short distance from the bottom of the compass card. The copper shell extends into the space between the elements 107 and 108 and between 110 and 111 which are carried by the compass card as shown in Fig. 15. The elements 108 and 110 are attached to the ends of the element 109 which is fastened to the compass card at its central portion. Any combination of elements of magnetized high coercive force material and of permeable material, may be used in the combination of Fig. 15 although it is preferred to have the heavier element in the center, as in Figs. 6 and 7.

In the arrangement of Fig. 15 the exterior housing is filled with any suitable damping liquid, suitable means being provided to allow for the expansion and contraction thereof due to temperature changes. The joint between the base 99 and the cover 103 enclosing the compass card, is leaktight and there is no liquid within the compass card enclosure. Vibrations of the mounting which holds the exterior housing are partially absorbed by the spring 96 and the damping liquid before they reach the air filled compass enclosure. The liquid also damps the tilting of the air filled compass enclosure.

In Figs. 17 and 18 an eddy current damped compass of the general type shown in Figs. 1 to 7 is detachably mounted in a support 112 having a flange 113 which is adaptable to be mounted on the instrument panel of an airplane, boat, automobile, or the like. The support 113 extends under the central part of the compass substantially for its entire diameter, and is of rigid construction. A spring element 114 is attached to the support 112 at its back portion and extends over the top of the compass where a lip 115 on the spring slips over the edge of the top of the compass to resiliently clamp it to the support. The bottom of the compass has a diametric V groove 116 in the same vertical plane as the continuous lubber line 117, all as in Figs. 1 to 7.

Fitting within a circular recess in the top of the support 112 and coaxial with the compass pivot, is a disc 118. This disc is rotatable within the recess and is clamped against rotation by a pair of clamp screws 119. On its upper surface the disc has a diametrically extending V-shaped ridge 120 which mates with the V groove 116 in the compass base. Thus when the compass is inserted between the support and spring the V groove and V ridge are first lined up and then the compass is slid onto the support until lip 115 engages the cover of the compass. When completely seated in the support the ridge is snugly seated in the V groove and holds the compass case against rotation. By loosening the screws 119, however, the compass case and disc 118 can be rotated. The purpose of the engaging V-shaped elements is that of a locating device to permit the compass to be instantly installed in its support and with its lubber line correctly aligned with the fore and aft axis of the craft or vehicle. However, since the instrument panel to which flange 113 is attached may be other than normal to the fore and aft axis, the adjustable disc 118 provides a ready means for shifting the locating means to the correct fore and aft position.

A compensator 121 is fixedly attached to or integral with the disc 118 so that it is always in alignment with the lubber line irrespective of the axis of mounting 112. The details of the compensator do not form any part of the invention, but a convenient type is shown, wherein north-south compensation is accomplished by turning the screw over the "NS" mark and the east-west compensation is accomplished by means of turning the screw over the "EW" mark.

The compass mounted in the support of Figs. 17 and 18 may be similar to any of the types shown in the other figures, and by a mechanical rearrangement of the parts well within the skill of one skilled in the art it may embody the variable damping controls disclosed in connection with the other figures. The specific compass shown in Figs. 17 and 18 is of the single pivoted type and therefore has a pair of laterally spaced magnets 122 and 123 within a copper cup 124. Other magnets, in alignment with the magnets 122 and 123 may be carried by the compass card to concentrate the magnetic field between them and through the wall of the cup, as previously disclosed. The lubber line 117 is continuous on the inside of the transparent cover and the compass card is both top and side reading as previously described in connection with other figures of the drawings. An optical sighting means as shown at 28b of Fig. 8 may be used.

The device in Figs. 17 and 18 provides a compass which is small, lightweight, of low cost, accurate, and adequately damped so that it is superior for use as a navigational instrument in aircraft or the like. When the particular aircraft or vehicle or the like is not in use the compass can easily be removed from its support and compensating means and be used as a hand held compass as when afoot. The V-shaped groove may also be used as a sighting means so that the compass can be used as a pelorus, etc., or means such as shown in Fig. 8 may be incorporated in the cover. Whenever it is desired to return the compass to its holder, the locating means, which in the embodiments shown are a pair of mating V-shaped elements in the compass and support, assure that lubber line of the compass will be correctly aligned with the fore and aft axis of the vehicle and with its compensating means.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. A compass needle comprising a magnetized central rod of high coercive force material; and rods adjacent each end and substantially axially aligned therewith, and of material which is highly permeable as compared to said central rod, said axially aligned rods being of less cross-sectional area than said central rod.

2. A magnetic compass comprising a card freely rotatable about an axis; means forming a wall of electrical conducting material coaxial with said axis; a magnetic system comprising at least one pair of magnetic rods carried by said card and located on the outside of said wall and at least one magnetic rod carried by said card and located within said wall, said magnetic rods being in coaxial arrangement with said wall protruding between their adjacent ends.

3. The device described in claim 2 wherein said one magnetic rod located within said wall is of magnetized high coercive force material and the remaining rods are of highly permeable material.

4. The device described in claim 2 wherein two of said magnetic systems are provided in spaced parallel arrangement in a horizontal plane.

5. A magnetic compass comprising a base; a transparent cup shaped cover joined to said base; a compass card having a scale visible through said cover and pivotally supported within said base and cover; at least one pole seeking magnetic element carried by said card; a relatively fixed electrical conductor cutting the lines of magnetic flux from said element to damp the movement of said card; spaced lubber line means in a vertical plane by which said scale can be read without parallax; a groove in the bottom of said base in the same vertical plane as said lubber line and providing sighting means whereby the compass can be used as a pelorus; a support operable to clamp said compass and fasten it to an instrument panel or the like; aligning means adjustably positioned in said support and operable to engage said groove in said base whereby said compass may be positioned parallel to the fore and aft axis of a vehicle or the like.

6. A magnetic compass comprising a card freely rotatable about an axis; a magnetic system comprising a central magnetized element of high coercive force material disposed between and coaxial with a pair of highly permeable magnetic elements which are of smaller cross-sectional area, said magnetic system being attached to said card for rotation thereof.

7. A magnetic compass comprising a metallic cup shaped base; a transparent cup shaped cover joined to said base; a compass card having a top reading scale visible through the top of said cover and a side reading scale visible through the side of said cover and pivotally supported within said base and cover; a pair of spaced parallel pole seeking magnetic elements carried by said card in a horizontal plane and extending close to the side walls of said base to damp the movement of said card; and lubber line means comprising a groove engraved in a vertical, diametral plane in the top and side surfaces of the inner wall of said cover for reading said card without parallax.

8. A magnetic compass comprising a base; a compass card pivotally supported on said base; at least one pole seeking magnetic element carried by said card; a lubber line; a cover for said card having a transparent section for viewing said card and lubber line; a groove in the bottom of said base in the same vertical plane as said lubber line and providing sighting means whereby the compass can be used as a pelorus; a support operable to clamp said compass and fasten it to an instrument panel or the like; aligning means adjustably positioned in said support and operable to engage said groove in said base whereby said compass may be positioned parallel to the fore and aft axis of a vehicle or the like.

9. A magnetic compass comprising a substantially cup-shaped card pivotally mounted so as to be rotatable in a normally substantially horizontal plane; said card having top and side reading scales thereon; a transparent cover having side walls and a top covering said card and lubber line means comprising vertically extending elements in a plane bisecting the card diametrically and a substantially horizontal element in the same plane, the said elements comprising a line engraved in the inner surface of the side walls and top of the cover, whereby parallax is avoided by aligning any two of said elements in the same plane as the indication on the compass card when reading the card.

10. A magnetic compass comprising a base; a compass card pivotally supported on said base; at least one pole seeking magnetic element carried by said card; a lubber line; and a support operable to be attached to an instrument board or the like and to hold said compass; said support and said compass having a detachable connection whereby said compass can be removed from said support and used as a hand held compass or the like; there being adjustable compensating means carried by said support whereby said compass is compensated when mounted upon said support; and means comprising a groove in said base and an interfitting rib on said support, constructed and arranged so that the compass and support will always have the same relative alignment when the compass is carried by said support so that the compensation of the compass while supported is not disturbed by removing it and reinserting it.

11. A magnetic compass comprising a base; a transparent cup shaped cover joined to said base; a compass card having a top reading scale visible through the top of said cover and a side reading scale visible through the side of said cover and pivotally supported within said base and cover; at least one pole seeking magnet carried by said card; a relatively fixed electrical conducting wall cutting the lines of magnetic flux from said magnetic element to damp the movement of said card and lubber line means comprising a groove engraved in the top and side surfaces of the inner wall of said cover positioned in a vertical plane by which either side of the said side reading scale or said top reading scale can be read without parallax by aligning said lubber line means in the same vertical plane as the eye of the observer.

LESTER WOLFE.

(References on following page)

REFERENCES CITED

The following references are of record in the file of this patent:

UNITED STATES PATENTS

| Number | Name | Date |
|---|---|---|
| 1,035,973 | Kraemer | Aug. 20, 1912 |
| 1,334,273 | Colvin | Mar. 16, 1920 |
| 1,474,394 | Warburg | Nov. 20, 1923 |
| 1,694,194 | Vion | Dec. 4, 1928 |
| 1,679,764 | Colvin | Aug. 7, 1928 |
| 1,930,775 | Schweisthal | Oct. 17, 1933 |
| 2,003,179 | Faus | May 28, 1935 |
| 2,087,086 | Beeson | July 13, 1937 |
| 2,127,878 | Martin | Aug. 23, 1938 |
| 2,155,712 | Hull | Apr. 25, 1939 |
| 2,402,638 | Krosnow et al. | June 25, 1946 |

FOREIGN PATENTS

| Number | Country | Date |
|---|---|---|
| 424,285 | Great Britain | Feb. 19, 1935 |
| 445,312 | Great Britain | Apr. 7, 1936 |
| 729,684 | France | May 2, 1932 |
| 813,078 | France | Feb. 15, 1937 |